United States Patent [19]

Kates

[11] 4,074,693

[45] Feb. 21, 1978

[54] READILY DISASSEMBLEABLE FLUID FLOW RATE CONTROLLER

[75] Inventor: Willard A. Kates, Winnetka, Ill.

[73] Assignee: The W. A. Kates Company, Deerfield, Ill.

[21] Appl. No.: 708,708

[22] Filed: July 26, 1976

[51] Int. Cl.² ............................................. G05D 7/01
[52] U.S. Cl. .................................. 137/454.6; 137/501
[58] Field of Search ............................. 137/454.6, 501

[56] References Cited

U.S. PATENT DOCUMENTS

| 1,787,686 | 1/1931 | Kerr | 137/501 |
| 2,646,078 | 7/1953 | Adams | 137/501 X |
| 2,742,764 | 4/1956 | St. Clair | 137/501 X |
| 3,223,115 | 12/1965 | Kates | 137/501 |

FOREIGN PATENT DOCUMENTS 935,791  9/1963  United Kingdom ................. 137/501

Primary Examiner—Robert G. Nilson
Attorney, Agent, or Firm—Wegner, Stellman, McCord, Wiles & Wood

[57] ABSTRACT

A readily disassembleable fluid flow rate controller arranged for facilitated sanitizing whereby the controller is adapted for use in controlling the flow rate of fluid food products and the like. The controller includes an adjustable orifice device and a spring-biased regulating device. The orifice and regulating devices are removably installed in a separable housing. Removable securing structure is provided to permit facilitated disassembly and assembly of the controller for facilitated sanitizing of the elements thereof.

13 Claims, 3 Drawing Figures

READILY DISASSEMBLEABLE FLUID FLOW RATE CONTROLLER

BACKGROUND OF THE INVENTION

1. Field of the Invention

This invention relates to fluid flow rate controllers and in particular to such controllers arranged for facilitated disassembly and assembly.

2. Description of the Prior Art

A number of improved flow regulators have been developed for regulating the flow of a fluid subjected to variations in pressure. Illustratively, in U.S. Pat. No. 2,859,769, of Alfred H. Viergutz, which patent is assigned to the assignee hereof, a fluid flow regulating device is shown wherein a valve is operated by an impeller positioned in an orifice. Differential pressure across the orifice serves to move the impeller therein thus to operate the valve means. The impeller is carried for limited free movement in the orifice to provide a self-centering functioning.

Another improved form of such a regulator is shown in U.S. Pat. No. 2,967,543, of Alfred H. Viergutz, which patent is owned by the assignee hereof.. Therein, the valving means is responsive to fluid flow to regulate the quantity of fluid permitted to flow through the outlet notwithstanding wide changes in the pressure of the fluid. The flow regulating means includes an impeller portion subject to fluid flow through the the valve and a valving portion adjacent the outlet of the valve and movable by the impeller portion to control the flow of fluid through the outlet. A spring is provided for constantly biasing the valve portion in one direction.

Another improved fluid flow regulator is disclosed in U.S. Pat. No. 2,984,261 of Willard A. Kates, owned by the assignee hereof. The flow control device disclosed therein includes valving means operable to control the area of flow ports in accordance with changes in fluid pressure so that the volume of flow through the ports is substantially constant. The valve is arranged to effectively minimize the occurrence of foaming in the fluid and thus is adapted for use with liquid, such as carbonated beverages.

In U.S. Pat. No. 3,040,759, of Willard A. Kates, which patent is owned by the assignee hereof, a ratio regulator is disclosed for blending a plurality of fluids in a preselected ratio utilizing a pair of opposed displaceable impellers arranged to be balanced only when a preselected ratio of pressures of the plurality of fluids controlled thereby is established.

In Willard A. Kates U.S. Pat. No. 3,294,361, owned by the assignee hereof, an adjustable rotary orifice is disclosed providing an infinitely variable flow controlling orifice which can be easily adjusted to an infinite number of settings to the end of maintaining a pressure differential on either side of the orifice within a given range so that sensing instruments being used to sense the fluid flow may operate within their optimum capabilities.

In U.S. Pat. No. 3,100,620, of Willard A. Kates, owned by the assignee hereof, an adjustable orifice for use in differential pressure apparatuses is disclosed in the form of an elongated slot, the length of which is adjustable to adjust the effective area of the orifice. The apparatus further includes means for regulating the pressure differential between the inlet and outlet thereof.

SUMMARY OF THE INVENTION

The present invention comprehends an improved readily disassembleable fluid flow controller having orifice means and spring-biased regulating means in a control chamber defined by a readily disassembleable housing.

The housing may include a body and a bonnet with threaded securing means for readily removably securing the body to the bonnet.

Additional threaded securing means may be provided for readily removably securing the orifice means to the housing.

The orifice means may be removed and installed as a unit and when removed from the controller, is arranged for facilitated cleaning and sanitizing.

The elements of the controller are made to be readily cleanable upon disassembly of the controller for facilitated maintenance and sanitizing thereof.

Thus, the controller of the present invention is adapted for use in installations, such as in controlling fluid food products, such as dairy food products. Relatively viscous fluid products may be readily controlled by the present controller.

In one form, the spring means for biasing the pressure regulating portion of the controller is disposed externally of the main housing defining the control chamber to provide for facilitated control of relatively viscous fluids.

In one form, the housing defines aligned inlet and outlet openings providing a substantially straight-through fluid flow.

In the illustrated embodiment, removable securing means are provided for removably securing the outlet portion to a midportion of the housing body, permitting slidable removal of the regulating means from the body upon removal of the outlet portion. The body midportion and outlet portion may define cooperating shoulder means for retaining the regulating means in the body when the housing is assembled.

The orifice means may extend through the body transversely to the direction of alignment of the inlet and outlet openings in the straight-through flow arrangement.

Where the spring for controlling the regulating valve is mounted externally of the main control chamber, the spring may be disposed in a spring housing removably secured to the bonnet of the main housing. The spring may be connected to the regulating valve by a rod extending from the valve outwardly from the control chamber into the separate spring housing.

In the illustrated embodiment, the external spring may comprise a compression spring acting between the bonnet and connecting means.

In the illustrated embodiment, the orifice means may include a rotatable inner member aligned with openings in a pressure-responsive piston member to provide improved control of the fluid flow rate.

Thus, the fluid flow rate controller of the present invention is extremely simple and economical of construction while yet providing a readily disassembleable arrangement providing facilitated maintenance and sanitizing such as for use in processing fluid food products and the like.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
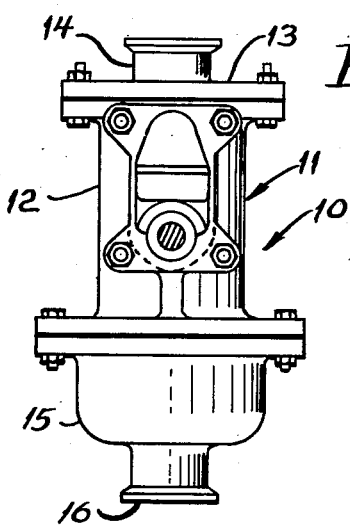
FIG. 1 is a side elevation of a fluid flow rate controller embodying the invention.
Figure 2:
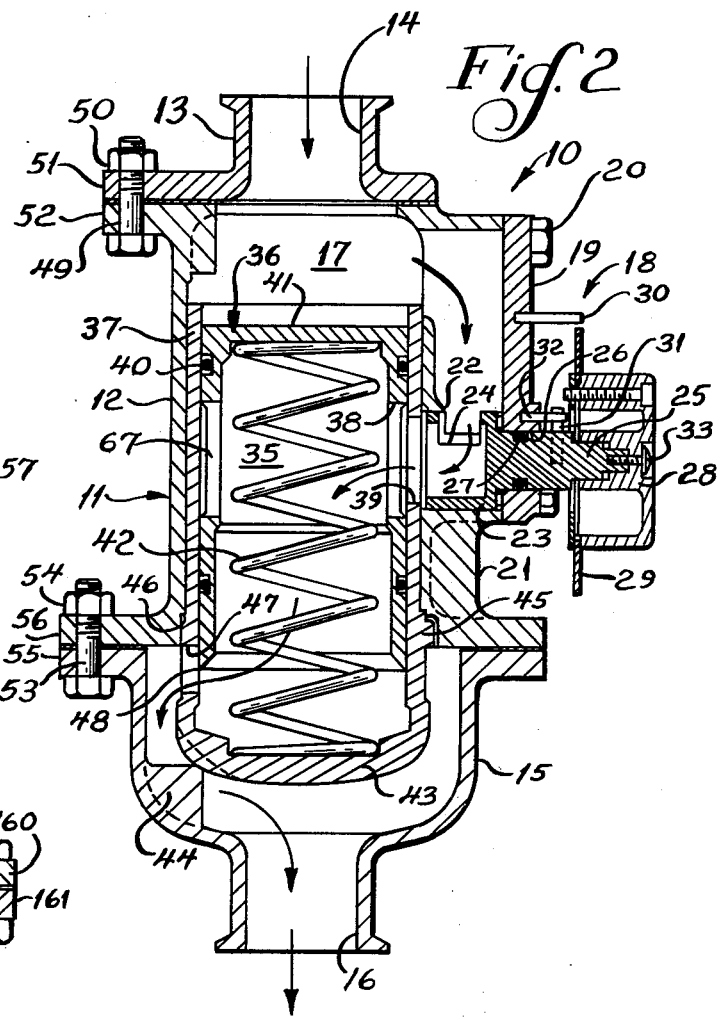
FIG. 2 is a diametric section thereof.

In the exemplary embodiment of the invention as disclosed in FIGS. 1 and 2 of the drawing, a readily disassembleable fluid flow rate controller generally designated 10 is shown to include a housing 11 having a body portion 12, a bonnet portion 13 defining an inlet 14, and an outlet portion 15 defining an outlet 16.

Referring now to FIG. 2, fluid may be delivered through the inlet 14 into a control chamber 17 defined by the housing 11. A flow control orifice device generally designated 18 is carried on a removable wall member 19 of the body 12, which may be secured thereto by suitable threaded securing means, such as bolts 20.

The orifice device 18 functions generally similar to the adjustable rotary orifice of Willard A. Kates U.S. Pat. No. 3,294,361 discussed above. Briefly, the orifice device includes an outer sleeve 21 defining a metering orifice 22. Within the orifice 22 of the sleeve is rotatably mounted an orifice cylinder 23. The cylinder defines a control opening 24 having selective registration with the orifice 22 for selectively blocking the orifice 22 as a function of rotation of a shaft 25 extending outwardly from the cylinder 23 through a suitable opening 26 in the wall member 19.

Shaft 25 may be rotatably sealed to the wall member 19 in opening 26 by suitable seal rings, such as O-ring 27.

The outer end of shaft 25 may be provided with a control knob 28 having an indicator dial 29 associated therewith for cooperation with an indicator pin 30 to provide an indication of the amount of registry of opening 24 with orifice 22 in the different adjustment positions of the orifice device 18.

Rotation of the control knob in shaft 25 is limited by a pair of cooperating pins 31 and 32 mounted respectively to the shaft 25 and wall member 19. As shown in FIG. 2, the control knob 28 may be removably secured to the shaft 25 by suitable threaded securing means, such as screws 33.

Orifice 22 may comprise an elongated annular slit with the opening 24 being selectively registrable therewith to provide an infinitely adjustable annular orifice.

The fluid flowing through controller 10 may flow from inlet 14 through the adjusted orifice 22 into a piston chamber 35 of a cup-shaped piston 36 slidably received in a cup-shaped valve sleeve 37. Piston 36 and sleeve 37 are provided respectively with aligned openings 38 and 39 for conducting the fluid from the control opening 24 of cylinder 23 into the piston chamber 35. As shown in FIG. 2, the piston chamber may be movably sealed to the sleeve 37 by suitable O-rings 40.

Piston 36 defines an end wall 41 exposed to the fluid entering the control chamber 17 from inlet 14. End wall 41 is biased toward inlet 14 by a helical compression spring 42 received in piston chamber 35 and extending between end wall 41 and an end wall 43 of the valve sleeve member 37.

The lower end of the sleeve 37 is clamped between the housing body 12 and outlet portion 15. More specifically, the end wall 43 of the sleeve abuts a plurality of inwardly extending shoulders 44 on the housing 11. The sleeve is further provided with an outwardly extending shoulder 45 abutting an inwardly extending shoulder 46 on body 12 whereby the lower portion of the sleeve is effectively retained between the outlet shoulder 44 and the body shoulder 46 in the assembled arrangement of the controller, as shown in FIG. 2.

Valve sleeve 37 defines an outlet opening 47 which is adjustably closed by a lower knife edge 48 of the piston 36. Resultingly, piston 36 cooperates with spring 42 in automatically adjusting the effective cross-sectional area of the outlet opening 47 to maintain a desired rate of flow over a wide range of pressure of the fluid delivered through the controller.

As best seen in FIG. 2, inlet 14 and outlet 16 may be coaxially aligned whereby the controller comprises an effectively straight-through controller. The bonnet 13 may be secured to the body 12 by suitable threaded means, such as bolts 49 and nuts 50 for removably clamping a flange 51 of the bonnet 13 to a flange 52 of the body. Thus, bonnet 13 may be readily removed and installed relative to the body 12.

Similarly, the outlet portion 15 may be secured to body 12 by suitable threaded securing means, such as bolts 53 and nuts 54 clamping a flange 55 of the outlet portion 15 to a flange 56 of the body. Thus, the outlet portion 15 may be readily removed and installed relative to the body 12 for facilitated maintenance of the controller. Upon removal of the outlet portion 15, the valve member 37 may be withdrawn from control chamber 17 together with the piston 36 and spring 42 for further facilitated servicing of the controller.

As indicated above, the orifice device 18 is similarly readily removed from the body 12 by means of the removable bolts 20. Resultingly, the entire controller may be readily disassembled and assembled for facilitated maintenance and sanitizing as desired. In the assembled arrangement, as shown in FIG. 2, the controller provides an improved flow rate control of a wide range of fluids having varying pressure, viscosity, etc. The moving parts of the controller in chamber 17 are extremely simple and readily cleanable for further facilitated sanitizing.

The elements of the controller 10 may be formed of any suitable sanitizable material, and in the illustrated embodiment, may be formed of stainless steel, or the like.

In the embodiment of FIG. 2, the flow of fluid through the controller is relatively unimpeded. However, where highly viscous fluids are to be controlled, the presence of spring 42 in the piston chamber 35 may cause some flow retardation. To effectively minimize such retardation as where highly viscous fluids are being controlled by the controller, a modified form of controller generally designated 110 is illustrated in FIG. 3 to comprise a controller generally similar to controller 10 but having the spring 142 mounted in a separate housing 157 removably installed to a modified bonnet 113 by suitable threaded means, such as bolts 158 and nuts 159 removably clamping a flange 160 of the housing 157 to a flange 161 of the bonnet 113.

The spring 142 is compressed between an outer wall portion 162 of the bonnet 113 and a retainer 163 carried on the upper end 164 of a connecting rod 165 extending upwardly from piston 136 through an opening 166 in bonnet 113. The inlet 114 of the bonnet may open transaxially to the piston 136 for delivering the incoming fluid around the connecting rod 165 into control chamber 117. Thus, the chamber 135 below piston 136 in body 112 is clear for facilitated flow of fluids therethrough, such as relatively viscous fluids.

Figure 3:
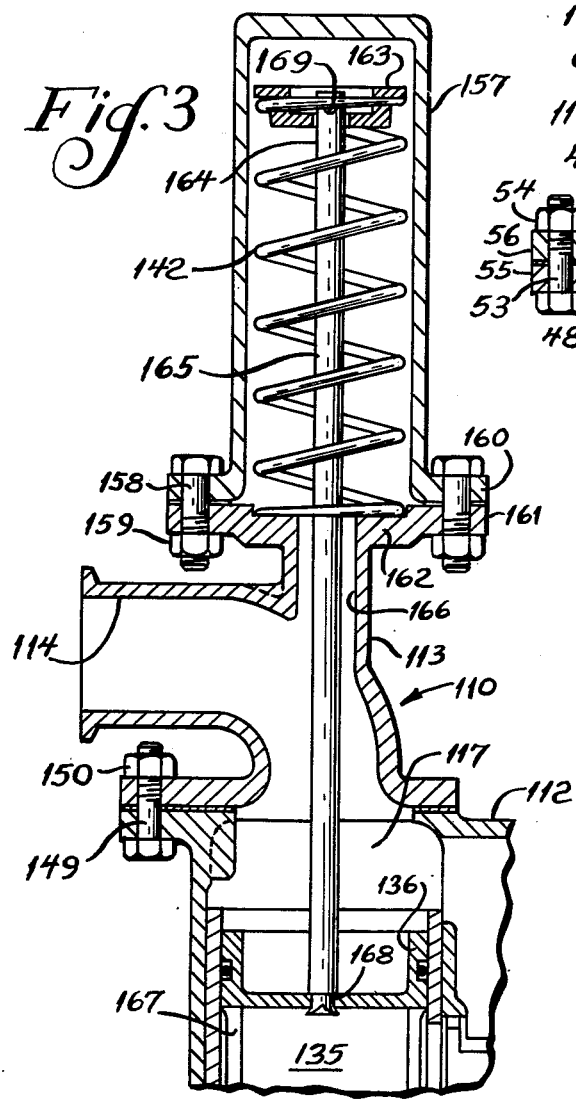
FIG. 3 is a fragmentary enlarged diametric section of a modified form of fluid flow rate controller embodying the invention.

As shown in each of FIGS. 2 and 3, the opening through the piston wall may extend substantially 360° to be defined by a plurality of struts 67, as shown in FIG. 2, and 167 as shown in FIG. 3, to assure free flow of fluid into the piston chamber notwithstanding any rotation of the piston about its longitudinal axis.

Connecting rod 165 may be secured to piston 136 by a suitable means, such as staking 168. Retainer 163 may be removably secured to the other end 164 of the connecting rod by a suitable pin 169. Thus, upon removal of the housing 157, the retainer 163 and spring 142 may be removed from the connecting rod, permitting removal of the bonnet 113 by the movement of control rod 165 through the opening 166 thereof. The bonnet 113 may be removably secured to the body 112 by suitable threaded securing means, such as bolts 149 and nuts 150. Resultingly, the controller 110 is readily disassembleable substantially in the same manner as controller 10 and provides the improved, facilitated servicing and sanitizing features of controller 10 while being further adapted for use with highly viscous fluids.

The structures of controllers 10 and 110 are extremely simple and economical while yet providing the highly desirable facilitated disassembly and assembly as discussed above.

The foregoing disclosure of specific embodiments is illustrative of the broad inventive concepts comprehended by the invention.

I claim:

1. A readily disassembleable fluid flow rate controller comprising: a housing including a body defining a midportion and an outlet portion, a bonnet defining an inlet, and first readily removable securing means removably securing the body to the bonnet to define an internal control chamber, said body defining an inlet opening opening to the bonnet for receiving fluid delivered through said bonnet inlet into the bonnet, said body further defining an outlet opening; orifice means in said control chamber and having adjusting means for providing an adjustable size orifice to provide a selected fluid flow from said inlet opening; second readily removable securing means removably securing said orifice means to said housing for installation in and removal from said control chamber as a unit; third readily removable securing means for removably securing said outlet portion of the body to said midportion; and spring biased regulating means in said control chamber for maintaining a preselected pressure flow rate of the fluid passing from said orifice means to said outlet, said regulating means being arranged to be slidably installed in and removed from said body midportion as a unit, said regulating means being retained against slidable movement outwardly from said body by said outlet portion as an incident of said outlet portion being mounted to said midportion and being slidably removable as a unit from said body upon removal of said outlet portion from said midportion.

2. The fluid flow rate controller of claim 1 wherein said inlet and outlet openings of the body define coaxially aligned openings providing a generally straight-through flow of the fluid through the body.

3. The fluid flow rate controller of claim 2 wherein said orifice means extends through said body transversely to the direction of alignment of said openings.

4. The fluid flow rate controller of claim 1 wherein said body midportion and outlet portion define cooperating shoulder means for retaining said regulating means in a preselected installed disposition in said body.

5. A readily disassembleable fluid flow rate controller comprising: a housing including a body, a bonnet, and first readily removable securing means removably securing the body to the bonnet to define an internal control chamber, said housing having an inlet opening and an outlet opening; orifice means in said control chamber and having adjusting means for providing an adjustable size orifice to provide a selected fluid flow from said inlet opening; second readily removable securing means removably securing said orifice means to said housing for installation in and removal from said control chamber as a unit; and spring biased regulating means in said control chamber for maintaining a preselected pressure flow rate of the fluid passing from said orifice means to said outlet, said regulating means being arranged to be installed in and removed from said control chamber as a unit, said regulating means including a cup member, a piston movably received in said cup member, and a biasing spring, said cup member and piston having adjustably aligned ports for providing a variable cross section flow passage, said spring positioning said piston in said cup member to adjust the effective cross section of said flow passage to maintain said preselected pressure of the fluid passing to said outlet opening, said cup member being removably fitted in said housing body for facilitated installation and removal of the regulating means in and from the housing body.

6. The fluid flow rate controller of claim 5 wherein said piston and biasing spring are removably received in said cup member for facilitated installation and removal thereof in and from the cup member.

7. A readily disassembleable fluid flow rate controller comprising: a housing including a body defining a midportion and an outlet portion, a bonnet defining an inlet, and first readily removable securing means removably securing the body to the bonnet to define an internal control chamber, said body defining an inlet opening opening to the bonnet for receiving fluid delivered through said bonnet inlet into the bonnet, said body further defining an outlet opening; orifice means in said control chamber and having adjusting means for providing an adjustable size orifice to provide a selected fluid flow from said inlet opening; second readily removable securing means removably securing said orifice means to said housing for installation in and removal from said control chamber as a unit; third readily removable securing means for removably securing said outlet portion to said midportion; and flow regulating means including a regulating valve slidably mounted in said body midportion, a biasing spring externally of said control chamber, and connecting rod means for connecting said spring to said regulating valve, said regulating valve and connecting rod means being removable as a unit from said body upon removal of said outlet portion from said midportion, said regulating valve being retained against slidable movement outwardly from said body by said outlet portion as an incident of said outlet portion being mounted to said midportion.

8. The fluid flow rate controller of claim 7 including a spring housing removably secured to said bonnet, said spring being disposed in said spring housing and said connecting means extending removably through said bonnet.

9. The fluid flow rate controller of claim 7 wherein said connecting means comprises a rod extending from said regulating valve outwardly from said control chamber.

10. The fluid flow rate controller of claim 7 wherein said spring comprises a compression spring acting between said housing and said connecting means.

11. A readily disassembleable fluid flow rate controller comprising: a housing including a body, a bonnet, and first readily removable securing means removably securing the body to the bonnet to define an internal control chamber, said housing having an inlet opening and an outlet opening; orifice means in said control chamber and having adjusting means for providing an adjustable size orifice to provide a selected fluid flow from said inlet opening; second readily removable securing means removably securing said orifice means to said housing for installation in and removal from said control chamber as a unit; and flow regulating means including a regulating valve in said control chamber, a biasing spring externally of said control chamber, and connecting means for connecting said spring to said regulating valve, said spring comprising a compression spring acting between an external surface of said housing and said connecting means.

12. A readily disassembleable fluid flow rate controller comprising: a housing including a body, a bonnet, and first readily removable securing means removably securing the body to the bonnet to define an internal control chamber, said housing having an inlet opening and an outlet opening; orifice means in said control chamber and having adjusting means for providing an adjustable size orifice to provide a selected fluid flow from said inlet opening; second readily removable securing means removably securing said orifice means to said housing for installation in and removal from said control chamber as a unit; and flow regulating means including a regulating valve in said control chamber, a biasing spring externally of said control chamber, and connecting means for connecting said spring to said regulating valve, said bonnet defining a first opening, a second opening coaxially aligned with said first opening, and a third opening, said connecting means extending through said first and second openings, said third opening defining said fluid inlet opening, and said first opening conducting fluid from the bonnet into said body.

13. The fluid flow rate controller of claim 12 wherein said third opening opens transversely to the direction of alignment of said first and second openings.

* * * * *